United States Patent [19]

Sauer

[11] Patent Number: 5,299,726
[45] Date of Patent: Apr. 5, 1994

[54] CONNECTION FOR GLAZINGS HAVING AN ELECTROCONDUCTIVE LAYER

[75] Inventor: Gerd Sauer, Stolberg-Venwegen, Fed. Rep. of Germany

[73] Assignee: Saint-Gobain Vitrage International "Les Miroirs", Courbevoie, France

[21] Appl. No.: 926,287

[22] Filed: Aug. 10, 1992

[30] Foreign Application Priority Data

Aug. 10, 1991 [DE] Fed. Rep. of Germany ....... 4126533

[51] Int. Cl.⁵ .......................... B23K 20/10; B23K 1/06
[52] U.S. Cl. ................................ 228/111.5; 228/124.1
[58] Field of Search ............ 228/124, 110, 262, 110 F, 228/179

[56] References Cited

U.S. PATENT DOCUMENTS

| | | | |
|---|---|---|---|
| 3,103,067 | 9/1963 | Dixon | 228/262 |
| 3,694,897 | 10/1972 | Akeyoshi et al. | 29/473.1 |
| 3,716,907 | 2/1973 | Anderson | 228/262 |
| 3,744,121 | 7/1973 | Nagano et al. | 228/110 F |
| 3,744,121 | 7/1973 | Nagano et al. | 29/502 |
| 4,106,930 | 8/1978 | Nomaki et al. | 75/134 B |
| 4,385,226 | 5/1983 | Sauer | 219/522 |
| 4,654,067 | 3/1987 | Ramus et al. | 65/60.5 |
| 4,721,845 | 1/1988 | Kunert et al. | 219/203 |
| 4,744,844 | 5/1988 | Hurst | 156/101 |
| 5,011,745 | 4/1991 | Dietrich et al. | 428/630 |
| 5,075,535 | 12/1991 | Hans et al. | 219/203 |
| 5,139,192 | 8/1992 | Simmonds | 228/179 |

FOREIGN PATENT DOCUMENTS

| | | |
|---|---|---|
| 0226901 | 12/1986 | European Pat. Off. |
| 0394089 | 10/1990 | European Pat. Off. |
| 0427619 | 5/1991 | European Pat. Off. |
| 0447069 | 3/1992 | European Pat. Off. |
| 1162167 | 1/1964 | Fed. Rep. of Germany |
| 1244530 | 1/1968 | Fed. Rep. of Germany |
| 2044675 | 7/1972 | Fed. Rep. of Germany |
| 2235376 | 2/1974 | Fed. Rep. of Germany |
| 2542988 | 4/1976 | Fed. Rep. of Germany |
| 2748239 | 5/1979 | Fed. Rep. of Germany |
| 3218338 | 11/1983 | Fed. Rep. of Germany |
| 3632348 | 11/1987 | Fed. Rep. of Germany |
| 3825671 | 3/1989 | Fed. Rep. of Germany |
| 3919974 | 12/1989 | Fed. Rep. of Germany |
| 3837458 | 5/1990 | Fed. Rep. of Germany |
| 3907783 | 9/1990 | Fed. Rep. of Germany |
| 4032192 | 6/1991 | Fed. Rep. of Germany |
| 9001070 | 7/1991 | Fed. Rep. of Germany |
| 2094356 | 2/1972 | France |
| 2236800 | 2/1975 | France |
| 2638934 | 5/1990 | France |
| 63-215368 | 9/1988 | Japan ................................. 228/262 |
| 1194090 | 6/1970 | United Kingdom |
| 1371738 | 10/1974 | United Kingdom |
| 1409964 | 10/1975 | United Kingdom |

*Primary Examiner*—Paula A. Bradley
*Assistant Examiner*—Jeffrey T. Knapp
*Attorney, Agent, or Firm*—Oblon, Spivak, McClelland, Maier & Neustadt

[57] ABSTRACT

For the electric connection of a transparent surface layer (2), serving in particular as a heating resistor, on a glazing or glass substrate (1), it is proposed to deposit a coating (4) of a brazing having a low melting point by utilizing a soldering or brazing machine subjected to an ultrasonic vibration. A connecting metal electrode (5) can be soldered in spots (6) or over its entire surface to the surface layer thus solidly coated. As a result, the performance of the connectors in the finished product is improved.

16 Claims, 2 Drawing Sheets

CONNECTION FOR GLAZINGS HAVING AN ELECTROCONDUCTIVE LAYER

BACKGROUND OF THE INVENTION

1. Field of the Invention

The invention relates to an improved process for connecting a thin transparent electroconductive layer deposited on a sheet of silicate glass, and particularly to a thin layer serving as a heating resistor on a glazing having electric heating.

2. Discussion of Background

Glass sheets having an electroconductive transparent coating are used in particular as heated glazings and may be utilized for various purposes such as antenna glazings, heated if applicable; windows having an electromagnetic shielding role, etc.

The laying or depositing of the connectors receiving the connecting wires (e.g. to couple the heating or electroconductive layer to a voltage source) involves a delicate operation. In most cases, it is first necessary to provide a collector for distributing the current along the edges opposite the conductive zone, however, on the heated glazings the most severe or difficult requirements are often encountered. Heated windshields of motor vehicles, for example, must have a high transparency, greater than 70% in the visible spectrum, and at the same time exhibit only a slight surface resistivity, of a few ohms per square cm. Their conductive layers (which are extremely thin because of the required transparency, and consequently are vulnerable), are then stressed almost to their load limit by a relatively high current density. The connection must provide, in the transition zone, an electric contact that is even and of good quality, to prevent any local surge of current.

The connection is particularly problematic when the thin layer itself consists of a film of a metal, such as silver, placed between semiconductive or nonconductive layers of metal compounds protecting it from outside influences and attenuating the reflectivity. Deposited by various processes, such layers with protective layers of metal oxides, whose total thickness is at most on the order of a micron, are today in common use.

Multiple solutions have therefore been proposed to connect these thin transparent layers. They consist essentially in reinforcing the concerned marginal zone with a conductive strip that is clearly thicker consisting, for example, of a silver-based electroconductive enamel and/or of a coating obtained by metallization, that can be deposited before or after the transparent layer, in particular to constitute the collector. The reinforced strip will then receive, preferably outside the layer, a connector soldered with a tin-based brazing, or will even be able to be doubled with a conductor for distribution of the current, wire or braid soldered from spot to spot or thin metal foil glued or merely pressed on the carrier sheet.

Each of these solutions has its own advantages and drawbacks in effectiveness, adherence, optical appearance, cost, durability, etc.

SUMMARY OF THE INVENTION

The present invention has as its object to provide a process creating, between a thin transparent electroconductive layer and a connecting collector, a reliable and durable connection that satisfies the highest requirements as to provision of a smooth passage of the current even under relatively high current density and/or voltage conditions.

Now it is also known by numerous publications that the association of ultrasonic vibrations with the standard brazing processes provides very effective solderings on various supports or substrates such as glasses and ceramics or metals and semiconductors, and such a solution is therefore used for the connecting of various electronic elements. In the case of a heating network made of parallel wires imprinted on the surface of a glazing from a conductive silver enamel, it has also been proposed by patent DEA-1 807 862 to produce the collectors directly by this method by laying or depositing the wires with the ends of the wires overlapping.

According to the invention, it is possible, with a soldering or brazing machine having a heated bit subjected to an ultrasonic vibration, to directly deposit a coating of a brazing having a low melting point even on thin transparent electroconductive layers, thereby binding it to the electroconductive layers effectively and with good adherence, even when the metal film itself is covered with a nonconductive layer having a base, for example, of metal oxides. These nonconductive layers (which typically are likely to prevent an effective electric connection of the underlying metal film with an electrode deposited thereon), seem broken apart by the energy of the ultrasonics, thereby establishing a direct metallic connection between the tin coating and the thin conductive film without destroying the latter even in the critical zone of the inner border. It has been proven that the process can also be used successfully even when the thin electroconductive layer consists not of a metal, but of a metal oxide such as an oxide, of tin or of tin and of antimony.

A delicate brazing coating thus deposited can serve directly as a lead-in on the thin layer in the form, for example, of a strip forming a collector that is soldered locally to a lead-in wire. If it is necessary to have higher currents pass through the thin layer, it is recommended to use said coating as a connection with a conductor in the form of a metal strip, for example a copper braid or foil, itself soldered by its intermediary. The soldering of said conductor can be performed over its entire length, however in many cases, it is sufficient to perform it in spots spaced by several centimeters.

According to the process of the invention, a good connection of the thin-layer heating resistors is obtained by imprinting and by baking of the strips of an electroconductive enamel. In the case of a paste containing silver and a glass frit having a low melting point on the glass sheet or on an underlayer of opaque enamel applied to its surface, the process is performed by depositing on the conductive strips, and on the rest of the surface of the glass, the single or multiple thin layer. Then, on the single or multiple thin layer, at right angles with respect to the conductive strips, a tinned coating, on which, finally, a copper strip is soldered to which the lead-in wire will be connected.

Known compositions with a base of lead, tin, zinc and antimony are suitable as brazing or soldering materials. Ultrasonic heat soldering machines that can be used for the purposes aimed at by the invention are known and available on the market.

It can be useful to preheat the glass sheet, for example to a temperature ranging from 50° to 100° C. and if necessary beyond, up to a maximum temperature on the order of 200° C., before adding the tin brazing using the ultrasonic soldering machine.

The process of the invention does not, of course, apply only to the production of heated glazings provided with contact electrodes in the form of strips, but also, the same advantages can be attained in connecting conductive layers to pinpoint electrodes, such as those used for example on antenna glazings. In addition, the process may be successfully used for connection of single or multiple thin semiconductive layers serving as solar cells, for example in the glass roofs of automobiles.

BRIEF DESCRIPTION OF THE DRAWINGS

A more complete appreciation of the invention any many of the attendant advantages thereof will become readily apparent from the following detailed description, particularly when read in conjunction with the drawings in which.

DESCRIPTION OF THE PREFERRED EMBODIMENTS

Figure 1:
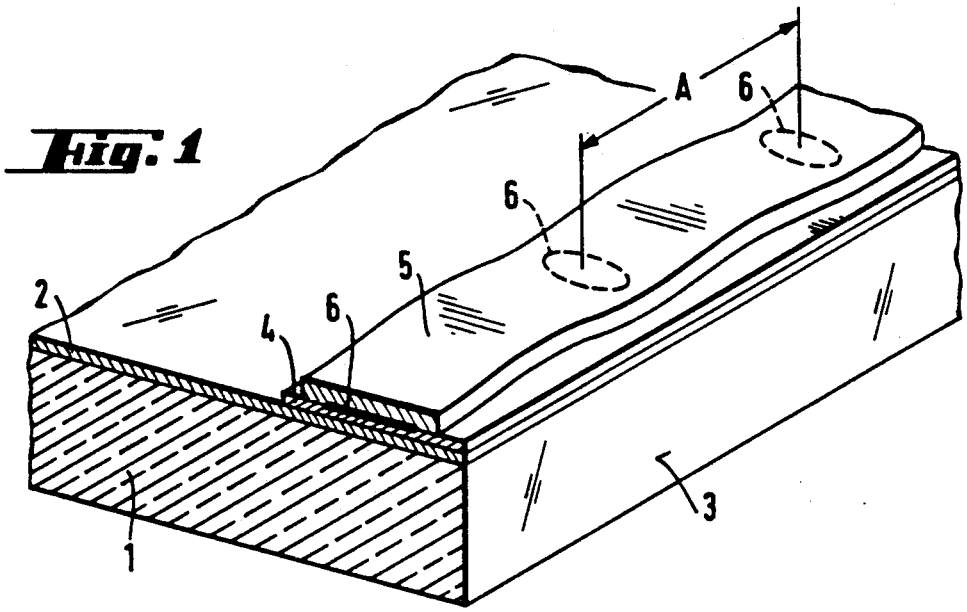
FIG. 1 is a perspective, partial section view of a monolithic glass sheet carrying a connecting electrode according to the invention.

Glass sheet 1, represented in FIG. 1, is provided on one of its faces with a thin transparent tin or indium oxide-based layer 2. This layer 2 has been deposited pyrolytically by spraying, on the surface, a solution of a suitable compound of tin and of indium which has been transformed into oxides under the effect of heat. Such oxide layers can be left in the open air without special protection.

Along or adjacent edge 3 of glazing 1, thin oxide layer 2 is covered with a coating 4 of a tin brazing; which is also provided along or adjacent the opposite edge. Brazing coating 4 is deposited with an ultrasonic soldering machine so that the liquid brazing spreads out over and, indeed, in the core of thin layer 2 by the heated bit with the ultrasonic vibration applied thereto. A copper strip 5 is applied to this tin coating, with the strip 5 spot soldered or brazed to at contact points 6 at a spacing A on the order of 10 cm. This strip 5, which can consist of a foil or a braid, is connected directly to the connector wire.

Figure 3:
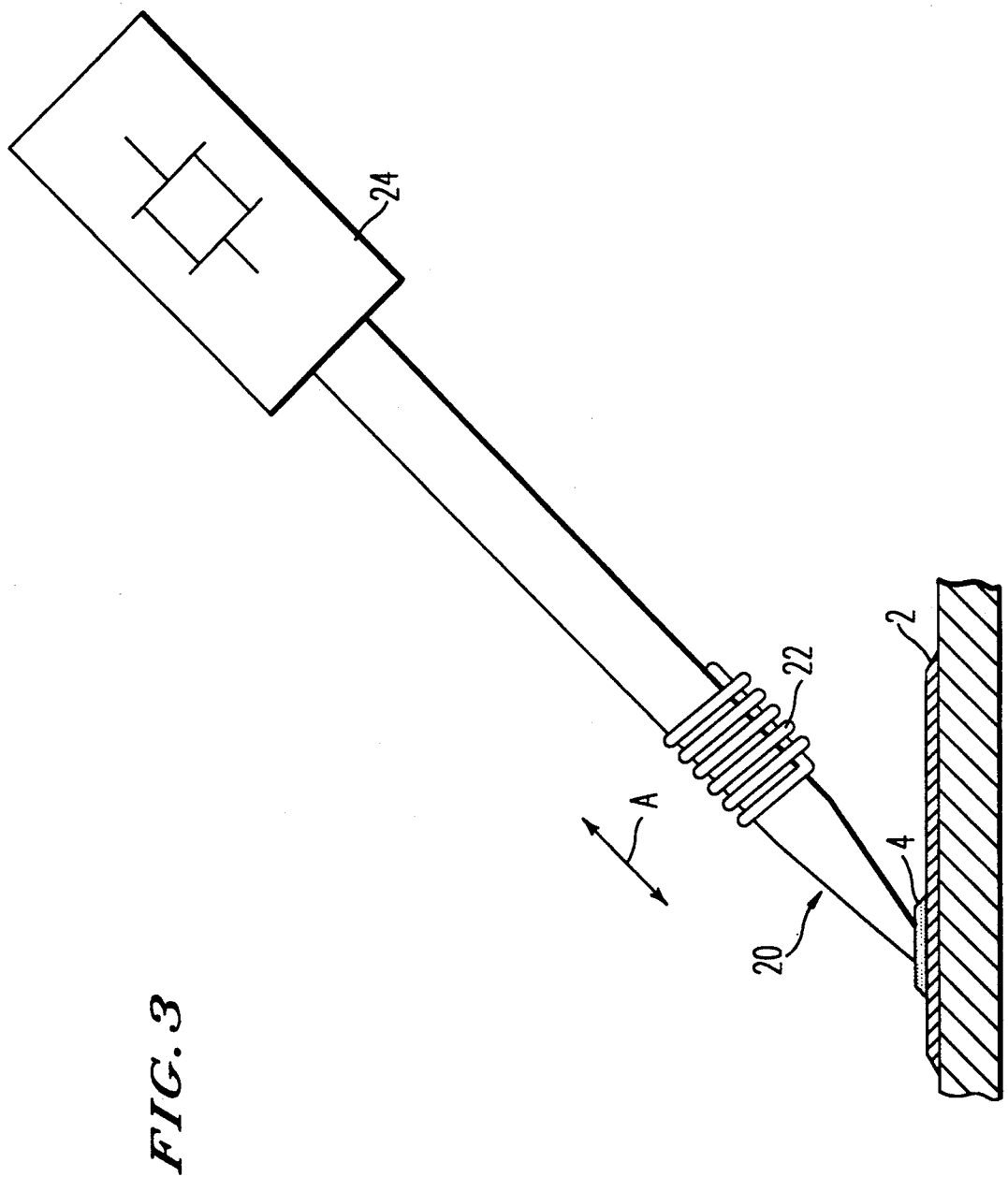
FIG. 3 schematically depicts depositing of a brazing with a heated bit subjected to ultrasonic vibrations.

FIG. 3 schematically depicts depositing of a brazing 4 on the thin transparent electroconductive layer 2 with a bit 20 which is heated (via heating spiral or heating coil 22) and subjected to ultrasonic vibrations (via ultrasonic accelerator 24). The arrow A denotes the oscillation direction provided by the ultrasonic accelerator.

Thin layer 2 can also be a multiple layer, made of three, four, or five layers, one middle layer of which consists of silver, with the last or uppermost layer of a nonconductive metal compound such as an oxide or a nitride. The ultrasonic depositing of tin coating 4 breaks apart this upper insulating layer of the multiple conductive layer along microcrevices through which an effective conductive electric connection is established between tin coating 4 and the silver film.

Figure 2:
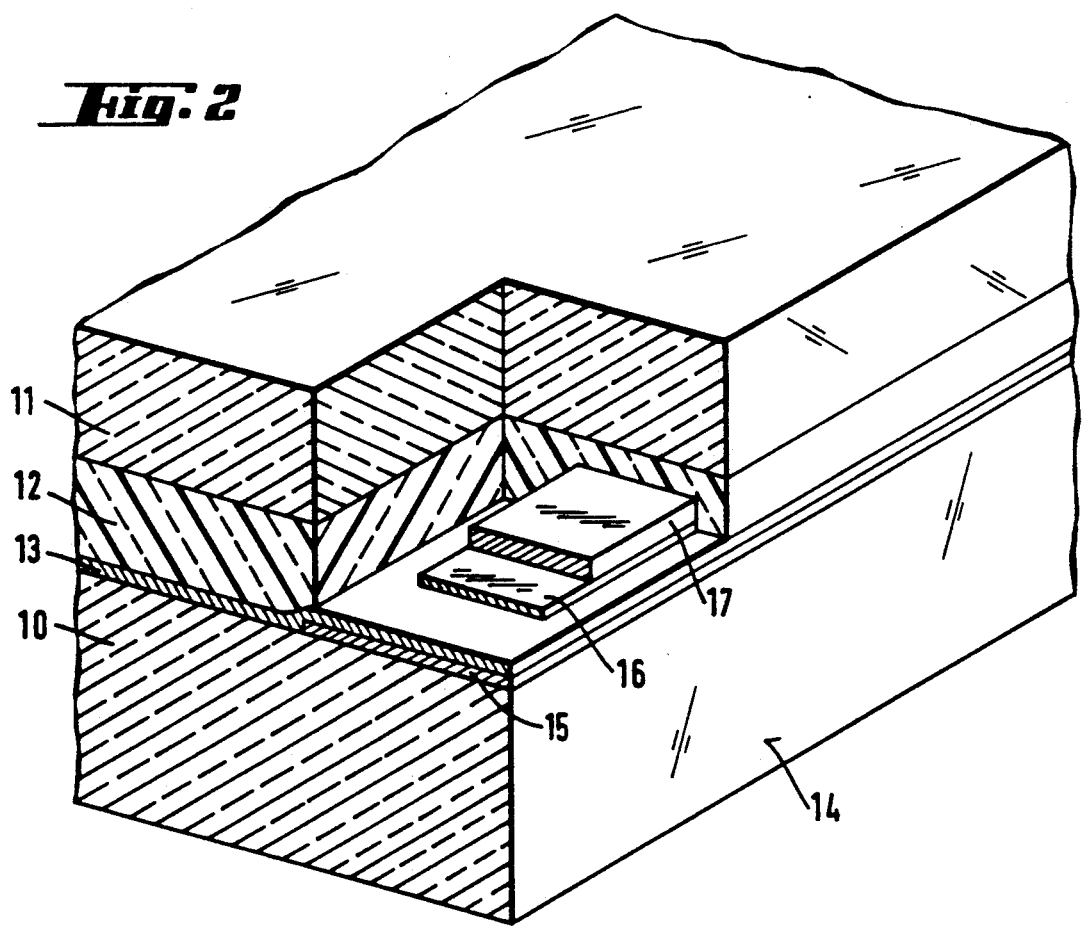
FIG. 2 is a perspective, partial section view of a multiple heated glazing carrying a connecting electrode according to the invention.

The multiple glazing represented in FIG. 2 comprises two glass sheets 10 and 11 connected by a thermoplastic insert 12. Transparent conductive layer 13 is a superposing multiple layer, for example, $SnO_2$-NiCr-Ag-NiCr-$SnO_2$, applied by cathode sputtering in an electromagnetic field on the surface of glass sheet 10 on which, along or adjacent its lateral edge 14, a thin strip 15 of a conductive silver paste had first been deposited in a standard way, e.g. by silkscreening then baked at high temperature. A delicate brazing coating 16 was then deposited using a soldering bit coupled with an ultrasonic generator, at right angles with respect to the conductive strip 15, on multiple layer 13 to which it is solidly connected under the effect of the ultrasonic energy. A copper strip 17 is then laid on the brazed coating on the entire surface of which it is solidly connected in direct electric contact with the brazed coating. The connector wire will be connected to the copper strip to provide a connection to an external power or voltage source.

Thus, the present invention provides an improved connection for glazings having an electroconductive layer. Among other features, the present invention particularly recognizes the improved connection attained by applying an ultrasonic soldering directly on a transparent layer which typically is not very adherent, such as a silver layer.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for connecting a thin transparent electroconductive layer deposited on a sheet of silicate glass, serving as a heating resistor on a glazing having electric heating, the process including:
   providing a thin transparent electroconductive layer;
   providing a coating of a brazing having a low melting point upon said thin transparent electroconductive layer; and
   connecting the coating of a brazing to said thin transparent electroconductive layer using a soldering machine having a heated bit subjected to an ultrasonic vibration;
   the process further including providing a lead-in metal electrode such that the thin transparent electroconductive layer is soldered by way of said brazing coating to the lead-in metal electrode.

2. The process according to claim 1 wherein the lead-in metal electrode is soldered to the thin transparent electroconductive layer at selected spots.

3. The process according to claim 1, wherein the lead-in metal electrode is soldered to the thin transparent electroconductive layer over its entire surface.

4. The process according to claim 1, wherein the step of providing a coating of a brazing includes providing an alloy of tin and lead with zinc and with antimony, as the brazing.

5. The process according to claim 1, further including preheating the glass sheet carrying the thin transparent electroconductive layer to a temperature of 50° to 200° C. before depositing of the brazing coating.

6. The process according to claim 1, wherein the steps of providing a thin transparent electroconductive layer includes providing a thin transparent electroconductive layer which includes a film of a metal placed between at least one of semiconductive and nonconductive layers of metal compounds.

7. A process for connecting a thin transparent electroconductive layer deposited on a sheet of silicate glass, serving as a heating resistor on a glazing having electric heating, the process including:
  providing a thin transparent electroconductive layer;
  providing a coating of a brazing having a low melting point upon said thin transparent electroconductive layer;
  connecting the coating of a brazing to said thin transparent electroconductive layer using a soldering machine having a heated bit subjected to an ultrasonic vibration;
  the process further including providing a lead-in metal electrode such that the thin transparent electroconductive layer is soldered by way of said brazing coating to said lead-in metal electrode;
  wherein the process further includes imprinting collecting strips on the surface of the glass from a suitable paste and baking on the imprinted collecting strips, with the step of providing a thin transparent electroconductive layer occurring thereafter such that the thin transparent electroconductive layer is deposited on the collecting strips and the contiguous surface of the glass, and the brazing coating is then deposited on the thin transparent electroconductive layer at right angles with the collecting strips, the method further including soldering a connecting electrode in the form of a strip to the coating.

8. The process according to claim 5, wherein the step of providing a coating of a brazing includes providing an alloy of tin and lead with zinc and with antimony, as the brazing.

9. The process according to claim 7, further including preheating the glass sheet carrying the thin transparent electroconductive layer to a temperature of 50° to 200° C. before depositing of the brazing coating.

10. The process according to one of claim 9, wherein the steps of providing a thin transparent electroconductive layer includes providing a film of a metal which is placed between at least one of semiconductive and nonconductive layers of metal compounds.

11. The process of claim 10, further including providing a film which includes silver as the film of metal.

12. A process for connecting a thin transparent electroconductive layer deposited on a sheet of silicate glass, wherein said thin transparent electroconductive layer serves as a heating resistor, the process including:
  providing a sheet of silicate glass;
  providing a thin transparent electroconductive layer upon said sheet of silicate glass;
  depositing a coating of a brazing having a low melting point upon said thin transparent electroconductive layer, with said depositing accomplished using a soldering machine having a heated bit subjected to ultrasonic vibration;
  the process further including providing a lead-in metal electrode such that the thin transparent electroconductive layer is soldered by way of said brazing coating to the lead-in metal electrode.

13. The process of claim 12, further including depositing a conductive strip upon said glass prior to depositing said thin transparent electroconductive layer.

14. The process of claim 13, wherein the step of depositing said conductive strip includes depositing said conductive strip along a lateral edge of said silicate glass, and wherein said edge extends in a first direction, and further wherein the step of depositing said brazing utilizing a soldering bit subjected to ultrasonic vibration includes depositing said brazing at right angles with respect to said conductive strip.

15. The process of claim 13, wherein the step of depositing said conductive strip includes depositing said conductive strip along a lateral edge of said silicate glass.

16. The process of claim 12, wherein the step of providing a thin transparent electroconductive layer includes providing a thin transparent electroconductive layer including silver with an uppermost layer of a nonconductive metal compound, and wherein the step of depositing accomplished using a soldering machine having a heated bit subjected to ultrasonic vibration forms microcrevices in said layer of a nonconductive metal compound such that said brazing is connected to said silver.

* * * * *